W. GEIST.
GLARE PROTECTOR.
APPLICATION FILED JUNE 24, 1918.
1,313,083. Patented Aug. 12, 1919.
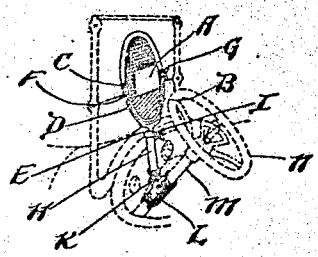
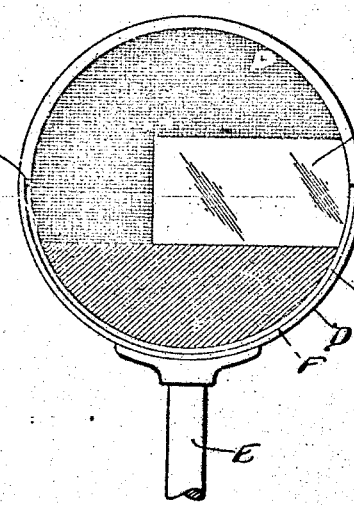
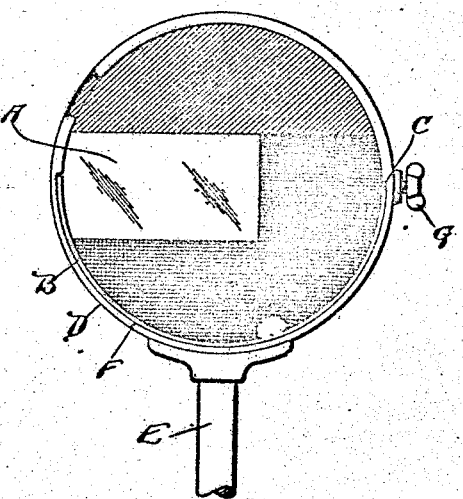
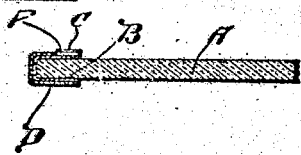
Attest.
Charles A. F. Becker.
Inventor.
William Geist,
by John H. Kinealy,
His Attorney.

UNITED STATES PATENT OFFICE.

WILLIAM GEIST, OF ST. LOUIS, MISSOURI.

GLARE-PROTECTOR.

1,313,083.   Specification of Letters Patent.   Patented Aug. 12, 1919.

Application filed June 24, 1918. Serial No. 241,718.

*To all whom it may concern:*

Be it known that I, WILLIAM GEIST, a citizen of the United States, residing in the city of St. Louis and the State of Missouri, have invented a new and useful Improvement in Glare-Protectors, of which the following is a full, clear, and exact specification, reference being had to the accompanying drawings, which form a part thereof.

My invention relates to devices for use on automobiles and other vehicles to protect the driver thereof from the glare of lights carried by approaching vehicles, such as automobiles and street cars, when driving at night, and against the glare of the sun when driving during the day.

The object of my invention is to provide a simple, cheap, device that can be used by the driver of an automobile when driving at night to protect himself from the glare of the lights of approaching automobiles, and which by a simple adjustment may be adapted to protect the driver of the automobile from the glare of the sun when driving late in the afternoon when the sun is low and the automobile is going in such a direction that the sun shines in the eyes of the driver.

My invention is fully shown in the accompanying drawings, where similar characters are used to designate similar parts.

Figure 1 shows the device mounted on the steering post of an automobile and in position for night driving; Fig. 2 is a view of the glare protector adjusted for night driving; Fig. 3 is a view of the protector adjusted for day driving; and Fig. 4 is a view showing details of construction.

Referring to the figures, A is a body having a centrally disposed transparent area with an area above it which is opaque, and having, also, a second area below it which is semi-opaque and, preferably, of an amber or green color. When in position for night driving as shown in Figs. 1 and 2 the opaque area is above the transparent area, while the semi-opaque area is below the transparent area. I prefer to have the opaque area extending also downwardly to the left of the transparent area as shown in Figs. 1 and 2. That is the opaque area, preferably, bounds the transparent area on the upper and the left sides when the device is in position for night driving, and the semi-opaque area lies below the transparent area, substantially as shown in Figs. 1 and 2. The body A is preferably made of glass, although it may be made of any suitable substance which may be provided with the three required areas. The body A is preferably made of a circular form so as to admit of easy adjustment. B is a binding of metal around the outer edges of the body A, and which is provided with a stop C. D is a holder in which the body A is mounted and which is, preferably, of U-shape in cross section as shown in Fig. 4, and which is attached to the rod E which forms a part of the support for the holder. The lower half of the body D is cut away to form the channel F in which the stop C is adapted to move. G is a friction screw by which the body A may be held in any desired position in the holder D. The rod E is slidably mounted in the tube H which has at its upper end the clamp I by means of which the rod may be held in any adjusted position. At its lower end the tube H is provided with a universal joint K by means of which it is connected to the clamp L which is adapted to be mounted on the steering post M of the steering wheel N.

When the device is used for night driving, that is to say when it is desired to use it as a protection against the glare of lights of approaching vehicles, the friction screw G is loosened and the body A is turned into the position shown in Fig. 2, the stop C being then in contact with the upper left end of the channel F. Then the screw G is tightened so as to secure the body A in fixed position in the holder D. Then the height and sidewise position of the body A is adjusted by means of the rod E, the tube H, and the universal joint K, so that the normal line of sight of the driver passes through the transparent part of the body A, and the opaque part of the said body extends substantially horizontally above the normal line of sight and vertically on the left of said normal line of sight. When in this position the semi-opaque area of the body A lies below the normal line of sight of the driver. When the driver sees approaching him a vehicle having a glaring headlight, he, being on the right side of the road, is able to interpose between his eyes and the light of the approaching vehicle the opaque area of the body A so as to protect himself from the glare of the approaching light, while at the same time he is able to see the right side of the road for a considerable distance in front of his machine. The driver merely moves his head so as to adjust his eyes in the required position to protect them from the glare of the approaching machine while still enabling him to see the right side of the road in front of his car. When the driver of the vehicle is driving during the day and the glare of the sun is likely to interfere with his driving, he loosens the screw G and turns the body A in the holder D from the position shown in Fig. 2 to that shown in Fig. 3, where the semi-opaque part of the body lies above the transparent body. He then adjusts, if adjustment be necessary, the height of the body A by means of the devices F, H and I, so that the driver looks through the semi-transparent part of the body A. This semi-transparent part being, as has been explained, preferably of an amber or green tint, the glare from the sun is minimized to such an extent that it does not annoy the driver, while at the same time the driver is allowed a sufficiently clear view of the road in front of his machine.

It is evident that, ordinarily, the adjustment of the height and sidewise position of the body A that is suitable for night driving will be found suitable for day driving, and to change the protector from the adjustment required for night driving to that required for day driving, or vice versa, it will only be necessary to loosen the screw G and turn the body A in the holder D to the right position, and then tighten again the screw G.

I do not intend to restrict myself to the exact proportions of the areas on the body A shown in the drawings nor to the exact method of mounting the body in the holder D or that of the holder on the support, since these may be varied to suit the requirements of different conditions without departing from the spirit of my invention.

What I claim as new and desire to secure by Letters Patent, is:

1. A glare protector comprising a support, a holder carried by said support, a body rotatably mounted in said holder and having a substantially clear area at the middle thereof and a light intercepting area at one side of the clear area.

2. A glare protector comprising a support, a holder carried by said support, a body rotatably mounted in said holder and having an opaque area on one side of the center thereof and a semi-opaque area on the opposite side of said center with a clear area between said opaque and semi-opaque areas.

3. A glare protector comprising a support, a holder carried by said support, a body rotatably mounted in said holder and having an opaque area on one side of the center thereof and a semiopaque area on the opposite side of said center with a clear area between said opaque and semiopaque areas, and means whereby said body may be secured in adjusted position in said holder.

In witness whereof I have signed my name to this specification.

WILLIAM GEIST.